July 2, 1968 F. W. BOSCH 3,390,775
CLEARING DEVICE FOR IRRIGATION DITCHES
Filed July 30, 1965 4 Sheets-Sheet 1
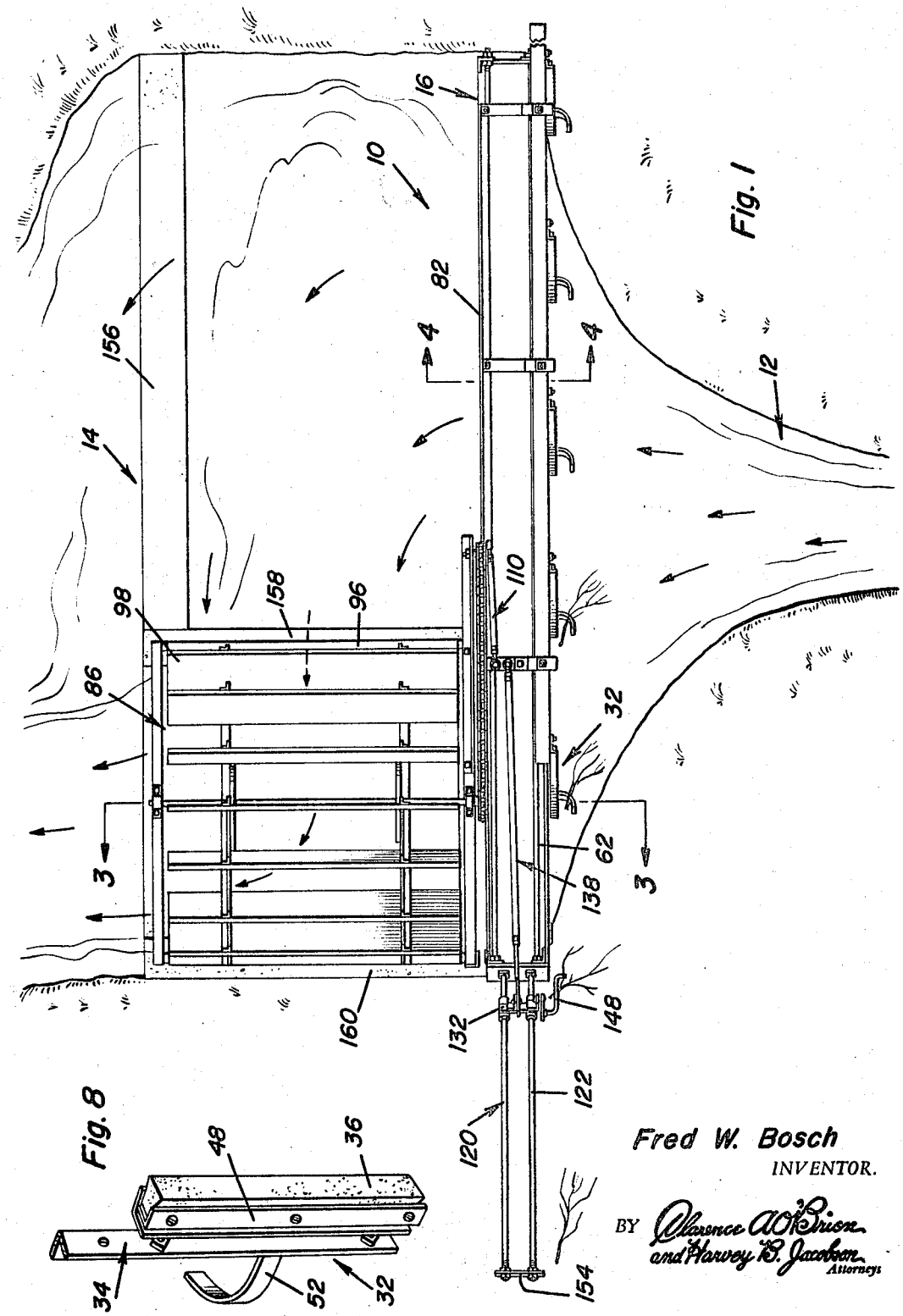
Fred W. Bosch
INVENTOR.

July 2, 1968
F. W. BOSCH
3,390,775
CLEARING DEVICE FOR IRRIGATION DITCHES
Filed July 30, 1965
4 Sheets-Sheet 2
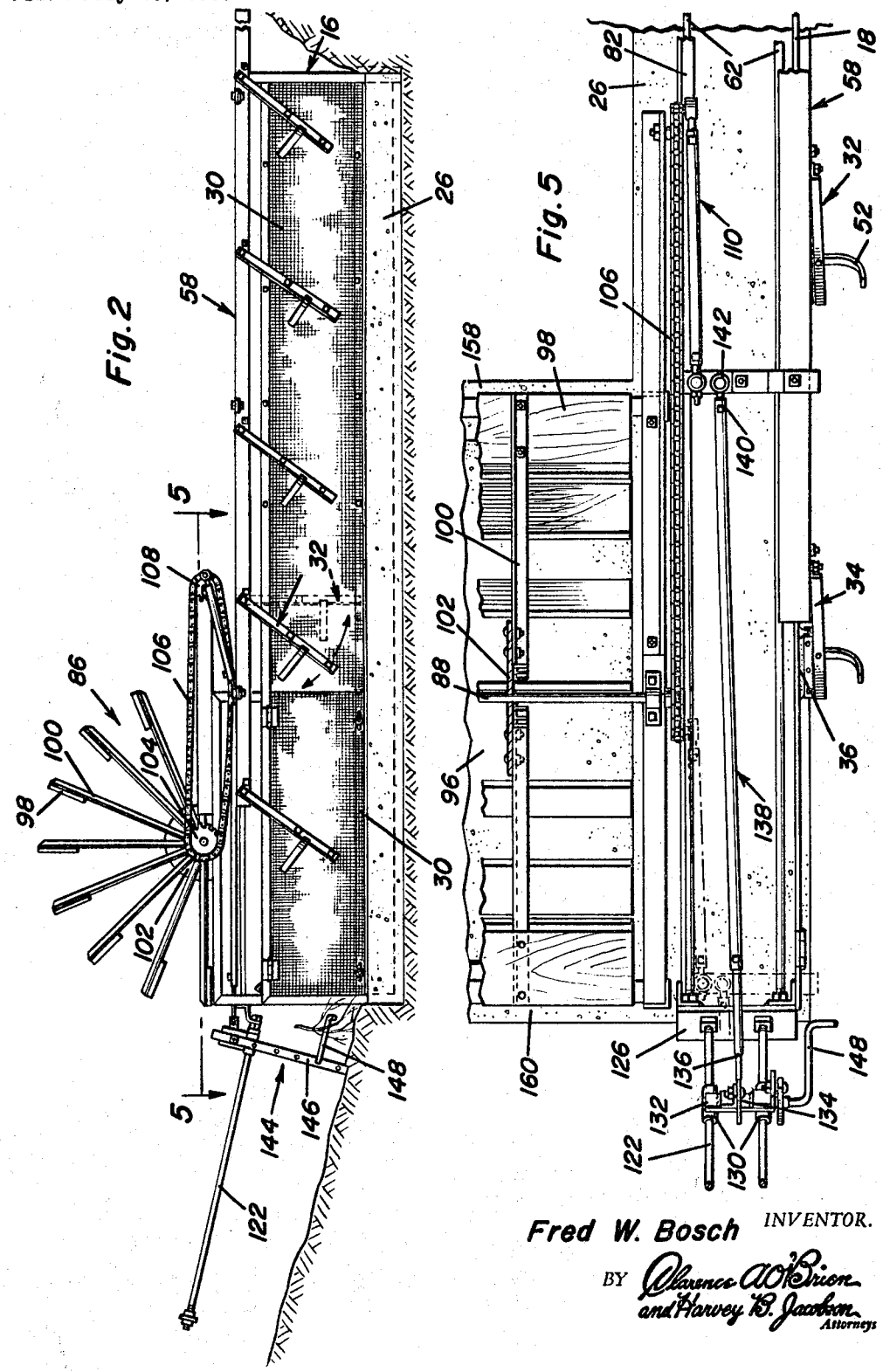
Fred W. Bosch INVENTOR.

July 2, 1968    F. W. BOSCH    3,390,775
CLEARING DEVICE FOR IRRIGATION DITCHES
Filed July 30, 1965    4 Sheets-Sheet 3
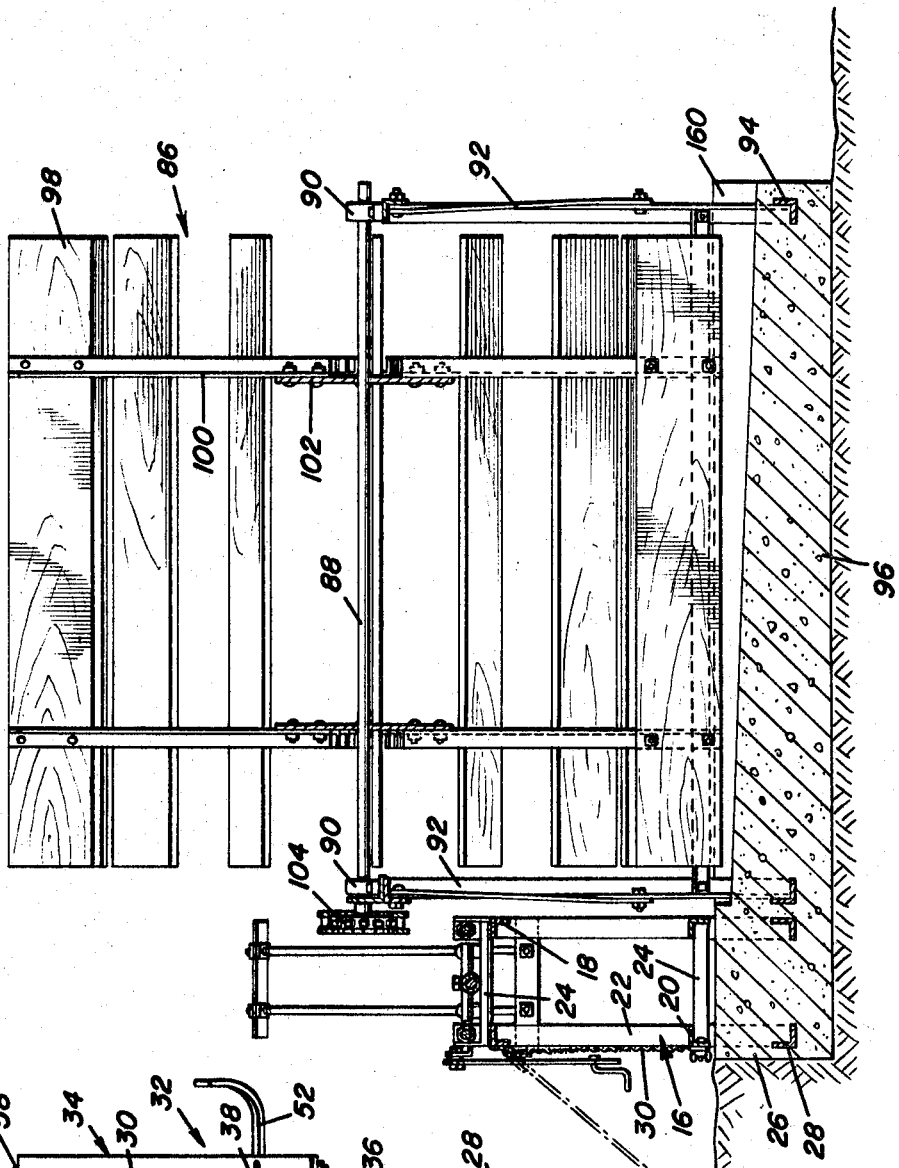
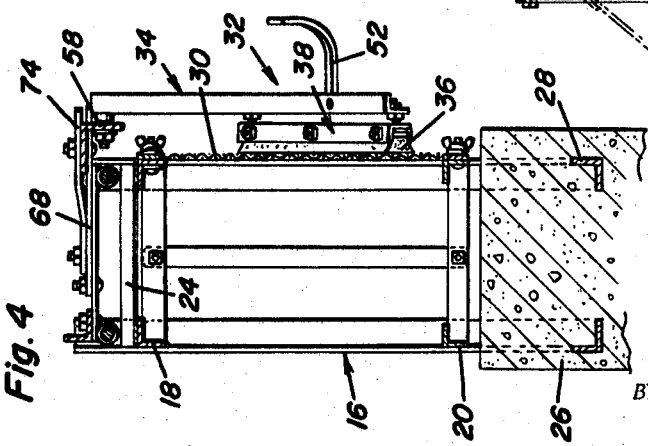
Fred W. Bosch
INVENTOR.

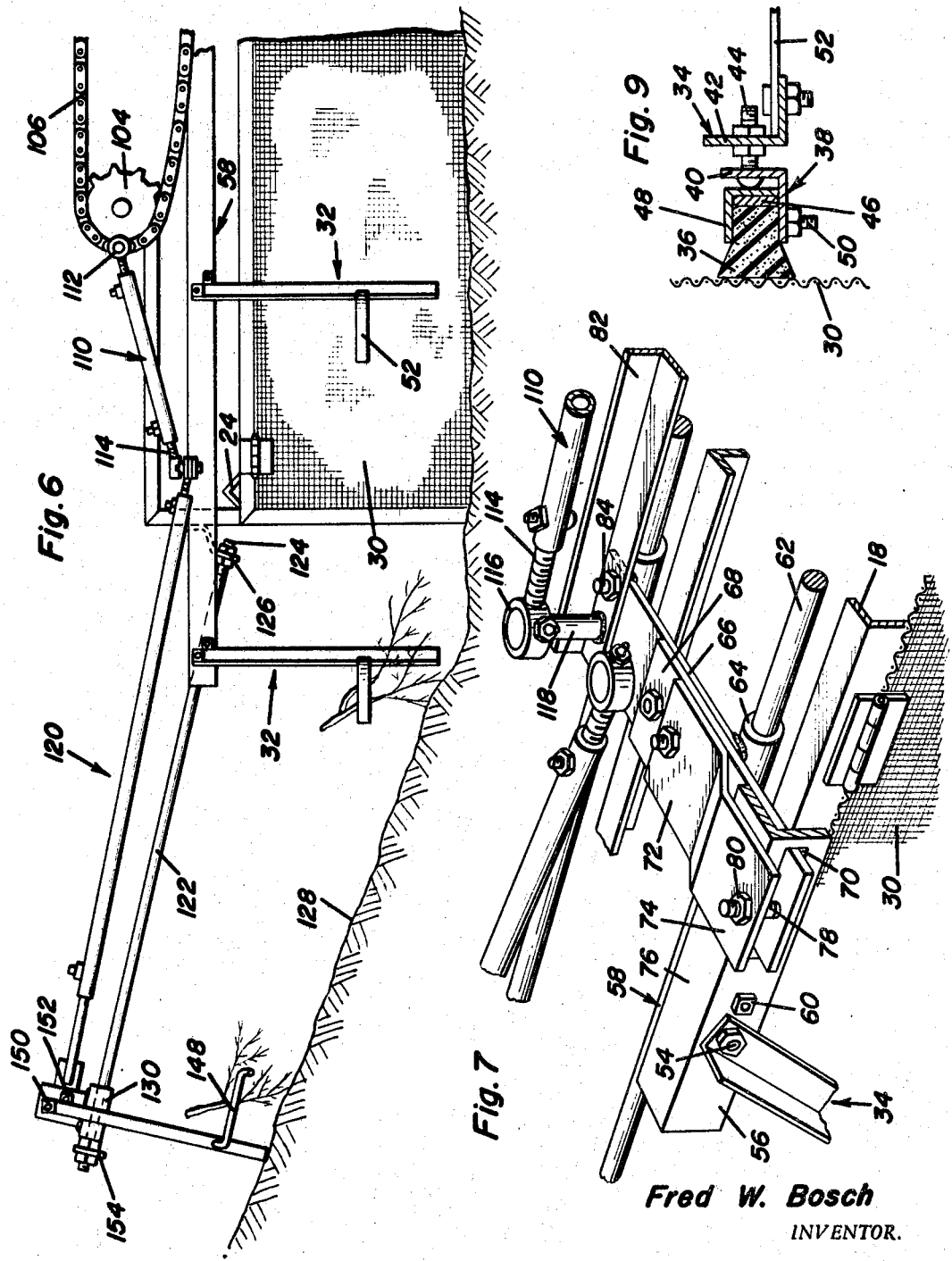

United States Patent Office 3,390,775
Patented July 2, 1968

3,390,775
CLEARING DEVICE FOR IRRIGATION DITCHES
Fred W. Bosch, Rte. 1, Worland, Wyo. 82401
Filed July 30, 1965, Ser. No. 476,017
12 Claims. (Cl. 210—156)

ABSTRACT OF THE DISCLOSURE

A frame positioned transversely across the flow channel of an irrigation ditch and mounting a plurality of vertical screen panels for blocking debris in the flow moving therethrough. A plurality of wipers are mounted across the upstream face of the panels and move laterally thereacross for effecting a lateral discharge of the debris. The operation of the wipers is effected through an enlarged paddle wheel located to one side of the main flow passage with at least a portion of the water being laterally diverted through the paddle wheel for effecting a rotational driving thereof.

---

The instant invention is generally concerned with irrigation ditches or channels, and more particularly relates to a clearing device for such ditches whereby all objectionable debris is effectively and continuously removed from the ditch and deposited at a point remote therefrom.

Accordingly, it is a primary object of the instant invention to provide a ditch clearing device which, during the operation thereof, effectively removes debris from the water flowing along the ditch in a manner which does not impede the flow itself.

In conjunction with the above object, it is also a significant object of the above invention to provide for a debris removing device wherein substantially all objectionable foreign matter is removed, such a complete debris removal being highly desirable when underground or suction tube systems are to be used downstream, such systems normally being easily clogged.

Also, it is an important object of the instant invention to provide a debris removing device which is capable of accommodating substantially any conceivable type or size of debris which might be carried along with the water flow.

Likewise, it is a significant object of the instant invention to provide a device which operates in response to the flow itself and is capable of operating in response to either small or large flows.

Further, the debris removing device is, while highly efficient in operation, of relatively simple construction requiring only a minimum amount of maintenance with the replacement of any of the parts, if necessary, requiring only a few minutes of time.

Furthermore, an important object of the instant invention resides in its ability to automatically operate in response to the water flow, no attendant being required.

Basically, the apparatus of the instant invention includes a frame mounted transversely across the flow channel of an irrigation ditch, this frame removably mounting a plurality of vertical screen panels which, while accommodating the flow therethrough, effectively block any debris. In addition, a plurality of overlapping wipers are mounted for movement across the upstream face of the screen panels so as to effectively laterally discharge any debris caught by the screen panels, this discharge of the debris being at a distance laterally of the flow channel. The operation of the screen wipers is effected through an enlarged paddle wheel located to one side of the main flow passage, the water, or at least a main portion thereof, being laterally diverted through the enlarged paddle wheel and subsequently discharged downstream thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the apparatus in operative position relative to an irrigation ditch;

FIGURE 2 is an upstream elevation of the installed device;

FIGURE 3 is an enlarged cross-sectional view taken substantially on a plane passing along line 3—3 in FIGURE 1;

FIGURE 4 is an enlarged cross-sectional view taken substantially on a plane passing along line 4—4 in FIGURE 1;

FIGURE 5 is an enlarged partial plan view taken substantially on a plane passing along line 5—5 in FIGURE 2;

FIGURE 6 is an enlarged partial elevational view at the discharge end of the apparatus;

FIGURE 7 is an enlarged partial perspective view detailing the wiper moving linkage;

FIGURE 8 is an enlarged perspective view detailing one of the wiper elements; and FIGURE 9 is an enlarged cross-sectional view through one of the wiper elements illustrating its construction and relation to the screen panels.

Referring now more specifically to the instant invention, reference numeral 10 is used to generally designate the entire device or apparatus. This apparatus, as will be best appreciated from FIG. 1, is located transversely across an irrigation ditch 12, the downstream end of which is slightly offset from the upstream end due to the lateral deflection, to some degree, of the water as it flows through the apparatus 10 and the concrete base 14 provided in conjunction therewith.

The apparatus 10 itself includes a rectangular frame 16 consisting of rigidly interconnected longitudinally extending upper and lower angle members or bars 18 and 20 suitably interconnected by rigid vertical angle members 22 welded therebetween, as well as transverse rigidifying members 24. With reference to FIGS. 3 and 4, it will be noted that the frame 16 is to be anchored in a concrete footing 26 poured transversely across the flow passage of the ditch 12. As such, the frame 16, along the bottom thereof, is provided with an anchoring assembly of members 28 which depend therefrom for embedment within the concrete footing 26. The height of the frame 16 above the footing 26 is to be approximately equal to the high water line.

Mounted on and overlying the upstream side of the frame are screen panels 30, the rigidity of these panels 30 being such so as to successfully stop the debris without sustaining damage, with the perforations in the panels 30 being such so as to allow for a substantially uninhibited flow of water therethrough. The screen panels 30 are preferably mounted so as to enable them to be easily positioned out of the flow stream, or completely removed from the frame 16. This is accomplished either by hinging the upper edge of the panel to the upstream upper frame member 18 and bolting the bottom thereof to the upstream lower frame member 20, as illustrated in connection with the left hand screen panel in FIG. 2, or by releasably bolting both the upper and lower edges of the screen panel 30 to the upper and lower upstream frame members 18 and 20, as illustrated in connection with the substantially longer right hand panel 30 in FIG. 2. In this manner, the screen panels 30, during those periods of the year when little or no debris is present, can be completely removed from the flow channel so as to both preserve the screen panels and remove even the slight flow impedance resulting from the presence of these panels.

While the screen panels 30 will effectively stop any debris carried along with the water flow, a clogging of the panels 30 would soon result unless provision were made for removing the debris. Accordingly, a plurality wiper units 32 are mounted for continuous movement across the upstream face of the panels 30 so as to effect a lateral moving of the debris to one side and out of the ditch 12. With reference to FIGS. 4, 8 and 9, it will be noted that each wiper unit includes an elongated right angular mounting arm 34 to which an enlarged generally rectangular wiper blade 36 is adjustably mounted by means of a right angular blade seating member 38 which in turn has one flange 40 thereof bolted to the parallel flange 42 of the arm 34 by bolt means 44 which is such so as to enable an adjustment of the flanges 40 and 42 relative to each other and, if deemed desirable or necessary, even at an angle to each other by positioning one end of the flange 40 closer to the flange 42 than the other end thereof. As will be appreciated, by being able to so adjust the seating member 38, an intimate engagement of the wiper blade 36 with the screen panel will be ensured. The wiper blade 36, having a rigidifying backplate 46, is releasably clamped to the seating angle 38 by a clamping angle 48 which is received within and parallels the seating angle 38 and has substantially smaller flanges whereby, through a series of nutted bolts 50, the clamping angle 48 can be drawn toward the seating angle 38, as best illustrated in FIG. 9, in a manner so as to effectively clamp the blade 36 therebetween with a substantial portion of the longitudinal face of the blade 36 projecting outwardly thereof for wiping engagement against the upstream face of the screen panels 30. Rigidly bolted to the mounting angle 34 and projecting downstream therefrom is an elongated curved member 52 which is specifically devised so as to sweep accumulated grass, thistles, weeds, etc. laterally out of the flow passage, thereby operating in conjunction with the wiper blade 36 so as to effect a complete removal of the debris. It will of course be appreciated that the member 52 is curved in the direction of movement so as to in effect cradle the grass-like debris.

The upper end of the angular mounting arm 34 is pivotally bolted, by means 54, to the vertical flange 56 of a carrier angle 58 which travels longitudinally back and forth along the length of the frame 16, thereby carrying the wiper units 32 therewith.

With reference to FIG. 2, it will be noted that each of the wiper units 32 pivots between a substantially completely vertical position as it moves forward along its debris removing travel, and a second position pivoted upwardly toward a horizontal position during its return movement, the limiting of the wiper unit 32 in these positions being effected by engagement of the upper end of the pivotally mounted mounting arm 34 with a stop 60 provided adjacent thereto and forming an abutment against which the mounting arm 34 engages in both of the extreme positions. The significance of the upwardly pivoted or returning position of the wiper units 32 is that it enables a return of the wiper units to their initial position without a corresponding return of the debris. In other words, the debris moved forward by the substantially vertical wiper units 32 remains in the forward position as the wiper units 32 pivot upwardly and are returned. Further, the length of travel of each of the wiper units 32 are to overlap. In other words, the starting point of each of the wiper units 32, other than the extreme end unit, is to have an initial or starting position located rearward of the terminating or finishing position of the preceding wiper unit 32, thereby providing for an intermittent movement of the debris completely across the upstream side of the apparatus for lateral discharge to one side of the flow channel in a manner which shall be described subsequently.

Provided longitudinally along the top of the frame 16, and spaced slightly thereabove, are a pair of laterally spaced elongated guide rails or rods 62 which slidably carry pairs of opposed sleeves 64 which in turn are rigidly interconnected, in each instance, by a plate 66 welded thereto and extending thereover.

An elongated flat strap or plate 68 is fixed, as by bolting, to each plate 66 and projects therefrom in an upstream direction with the projecting end thereof being received through an elongated slot 70 in the vertical flange 56 of the carrier angle 58 at a point offset from the wiper unit mounting arms 34. In addition, a second plate 72 is bolted to the plate 68 and extends substantially parallel therewith, the outer end portion 74 of the plate 72 being upwardly offset in a manner which enables an accommodation of the upper flange 76 of the member 58 between the plates 68 and 72 with the extreme outer ends of these plates being selectively drawn together by an elongated threaded bolt 78 including a nut 80 threaded thereon, thereby providing for an effective clamping of the carrier angle 58 in a manner which rigidly fixes the carrier member 58 to the slidably mounted sleeves 64 for movement therewith. Further rigidity is introduced into this particular portion of the structure by an elongated bracing angle 82 secured, as by bolts 84, to the downstream end of the sleeve connecting plates 66 and extending along substantially the full length of the downstream guide rod 62.

The actual reciprocal driving of the carrier angle 58 is effected by the flow of water itself, this flow being generally laterally directed for passage through an enlarged paddle wheel 86 located just downstream of one end portion of the frame 16 and slightly to one side of the main upstream flow channel, this being best appreciated when viewing FIG. 1. The paddle wheel 86 is orientated so as to generally parallel the flow channel 12 and has the axle 88 thereof rotatably mounted at its opposite ends within suitable self-adjusting bearing units 90 supported at an elevated position by suitable framework 92 which in turn has the lower end 94 thereof embedded within a poured concrete base 96 integrally formed with the aforementioned frame footing 26. In addition to the central axle, the paddle wheel 86 includes a plurality of radially orientated elongated flat paddles 98 rigidly affixed to the axle 88 for rotation therewith through a plurality of up-radially extending arms 100 and central hub units 102. The stream end of the axle 88 projects outwardly beyond the corresponding bearing unit 90 and fixedly mounts a gear 104 for rotation therewith, this gear 104 having an endless link chain 106 entrained thereabout with the far end of the link chain also being entrained about a suitably mounted idler gear 108. Thus, as the paddle wheel 86 rotates, the endless link chain 106 is driven about its path. This oblong travel of the chain 106 is translated into a horizontal reciprocation of the wiper units 32 through an elongated linking arm 110 having an adjustable first end 112 thereof pivotally connected to a portion, generally one link, of the chain 106 for travel therewith, with the other adjustable end 114 thereof being hingedly or universally connected, as at 116, to one of the adjacent sleeve connecting plates 66 through a vertical stub 118. With reference to FIG. 2, it will be noted that as the secured end 112 of the linking arm or member 110 proceeds along the lower run of the chain 106, the wiper units 32 are proceeding forward and moving the debris laterally toward one side of the ditch and, as the connected end 112 proceeds along the top run of the chain 106 toward the right hand side of FIG. 2, the wiper units 32 are returned, these units 32 being pivoted upwardly during the return thereof so as to release the previously moved debris for engagement by the adjoining wiper unit 32 during the subsequent cycle. The slidable engagement of the sleeve 64 with the guiding rods or rails 62 ensures the proper horizontal movement of the wiper units 32.

In order to effect a positive movement of the debris upward and outward of the ditch, an extension unit 120 is provided and forms a continuation of the discharge end of the frame 16. This extension unit includes a pair of spaced parallel elongated guide rods 122 fixedly bolted at the inner end 124 thereof to a transverse plate 126 rigidly affixed, as by welding, to the adjoining end of the frame 16, these guide rods 122 extending upwardly from the secured ends 124 thereof at an angle substantially paralleling the angle of the ditch bank 128. Slidably mounted on the guide rods or rails 122 are a pair of aligned sleeves 130 interconnected by a flat plate 132 welded thereto. This plate 132 pivotally mounts, as at 134, the adjustable end 136 of an elongated linking arm or member 138, the opposite adjustable end 140 being universally mounted, as at 142, to the endmost sleeve connecting plate 66, this particular plate 66, in the illustrated embodiment, being that to which the first linking arm 110 is engaged. In this manner, the sleeve mounted plate 132 will reciprocate in unison with the wiper units 32, the sleeve mounted plate 132 also including a debris pushing member 144 engaged therewith and operative in substantially the same manner as the wiper units 32. This unit 144 includes a vertical member 146 and an upstream directed curved or bent grass retaining arm or member 148 capable of receiving the debris from the discharge point of the endmost wiper unit 32. With reference to FIG. 6, it will be noted that the member 146 is also pivotally mounted at the upper end 150 thereof with an abutment 152 being provided so as to limit the pivotal movement of the member 146 to two positions generally corresponding to the two positions of the wiper units 32 for operation in the same manner as the wiper units. With continuing reference to FIG. 6, it will be noted that the endmost wiper unit 32 moves beyond the end of the frame 16 so as to direct the debris outward of the flow channel, at which point it is picked up by the pushing unit 144 for movement up the bank of the channel. While the screen panels 30 have been shown as stopping at a point short of the end of the outermost position of the last wiper unit 32, an additional screen panel can also be provided generally paralleling the guide rods 122 if deemed necessary. Incidently, the extreme outer ends of these guide rods 122 are rigidly interlocked by a transversely extending plate 154 bolted thereto.

Referring now specifically to FIG. 1, it will be noted that the apparatus 10 is positioned transversely across a ditch with the upstream flow passage engaging the frame mounted screen panels at approximately the center of the frame with the panels retaining the debris while the water flows therethrough. Upon flowing past the frame 16, a major portion of the water is laterally diverted through the enlarged paddle wheel 86. This is achieved by providing an elongated retaining wall 156 of a height slightly greater than the relatively shorter height of the adjacent wall 158 which separates the paddle wheel base 96 from the main flow receiving portion downstream of the frame 16. The retaining wall 156, while being of a sufficient height so as to divert a major portion of the flow laterally through the paddle wheel 86, is of a height so as to allow it to be easily overrun in the case of greater than normal flow, or at least flow in excess of that needed to properly operate the paddle wheel 86. Incidently, as will be appreciated from FIG. 3, the base 96 of the paddle wheel unit 86 underlies the entire paddle wheel and forms a floor therefor so as to avoid erosion beneath the paddle wheel such as would tend to interfere with its proper operation. Further, this floor slopes slightly downward toward the lower downstream end thereof so as to provide for a continuing of the flow of water to the downstream side of the apparatus 10 in general alignment with the paddle wheel 86. While it is appreciated that some of the upstream water flow may enter the paddle wheel unit directly from the upstream side thereof rather than being laterally directed thereto, in actual practice this flow is minimal and in no way interferes with the operation of the unit. In order to assist in properly directing the water to the downstream side of the paddle wheel, it will be noted that a vertically projecting retaining wall 160 is also provided on the bank side of the paddle wheel floor or base 96.

From the foregoing, it will be appreciated that a highly novel clearing device for irrigation ditches has been defined, this device combining a debris catching and stopping screen unit in conjunction with a plurality of wiping units which continually move the debris from the face of the screen laterally across the ditch and outward therefrom. Further, it will be noted that the upstream or debris catching face of the screen panels is completely exposed to the flow, thus avoiding any structure against which the debris might become wedged during the removal thereof by the reciprocating wiper units. Also of significance is the manner in which the wiping units of the instant invention are to be operated in direct response to the water flow which is in turn controlled and directed so as to flow along a predetermined course through an enlarged paddle wheel prior to discharge on the downstream side of the device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A debris removing device for water channels comprising an elongated rigid frame positionable transversely across a water channel, vertical perforated screen means mounted vertically on the upstream side of said frame along substantially the full length thereof, debris pushing elements slidably engaged with the upstream face of said screen means and movable longitudinally therealong, and means for reciprocally moving said debris pushing elements along said upstream face, said means for reciprocally moving the debris pushing elements comprising an enlarged paddle wheel mounted on the downstream side of said frame adjacent one end thereof, said paddle wheel being rotatably mounted about an axis generally paralleling the water channel and extending perpendicularly downstream from the frame, and means for drivingly engaging the paddle wheel with the debris pushing elements, said last-mentioned means comprising elongated rail means mounted on and extending longitudinally along said frame, a carriage unit slidably mounted on said rail means for longitudinal sliding therealong, said pushing elements being mounted on and depending from said carriage unit, an endless chain means mounted on said frame and continuously driven by rotation of said paddle wheel, and rigid link means interconnecting a portion of said chain means and said carriage unit so as to effect a reciprocal movement of said carriage unit in response to a movement of said chain means.

2. The structure of claim 1 including means for diverting a portion of the water flow laterally through said paddle wheel, said diverting means consisting of an elongated vertical wall positioned downstream of said frame and acting so as to partially deflect the water flow.

3. The apparatus of claim 2 wherein said debris pushing elements are pivotally mounted for movement in a vertical plane paralleling the vertical plane of the screen means between a first substantially vertical position and a second forwardly angled position toward that end of the frame to which the debris is to be moved.

4. The apparatus of claim 3 including an extension on the debris receiving end of said frame, said extension extending longitudinally from said frame and slidably mounting thereon a debris receiving and discharging element operative in conjunction with the debris pushing elements so as to effect a lateral discharge of the debris at a point distant from the water channel.

5. The apparatus of claim 4 wherein each of said debris pushing elements includes an upstream projecting hooked arm for the grasping reception of grass-like debris.

6. The apparatus of claim 5 wherein said debris pushing elements further include resilient wiper blades engaged against the face of said screen means.

7. The apparatus of claim 6 wherein said screen means are mounted for removal from the upstream side of said frame.

8. The apparatus of claim 1 wherein said debris pushing elements are pivotally mounted for movement in a vertical plane paralleling the vertical plane of the screen means between a first substantially vertical position and a second forwardly angled position toward that end of the frame to which the debris is to be moved.

9. The apparatus of claim 1 including an extension on the debris receiving end of said frame, said extension extending longitudinally from said frame and slidably mounting thereon a debris receiving and discharging element operative in conjunction with the debris pushing elements so as to effect a lateral discharge of the debris at a point distant from the water channel.

10. The apparatus of claim 1 wherein each of said debris pushing elements includes a resilient wiper blade engaged against the face of said screen means, and an upstream projecting hooked arm for the grasping reception of grass-like debris.

11. A debris removing device for water channels comprising an elongated rigid frame positionable transversely across a water channel, vertical perforated screen means mounted vertically on said frame along substantially the full length thereof, debris pushing elements slidably engaged with the upstream face of said screen means and movable longitudinally therealong, and means for reciprocally moving said debris pushing elements along said upstream face, said means for reciprocally moving the debris pushing elements comprising an enlarged paddle wheel mounted on the downstream side of said frame adjacent one end thereof, said paddle wheel being rotatably mounted about an axis generally paralleling the water channel and extending perpendicularly downstream from the frame, and means for drivingly engaging the paddle wheel with the debris pushing elements, and an elongated vertical wall positioned downstream of said frame for diverting a portion of the water flow laterally through said paddle wheel, said wall, while being of a height so as to divert a sufficient portion of the water flow to operate the paddle wheel, also being of a height easily overrun by an excessive flow.

12. A debris removing device for water channels comprising an elongated rigid frame positionable transversely across a water channel, vertical perforated screen means mounted vertically on said frame along substantially the full length thereof, debris pushing elements slidably engaged with the upstream face of said screen means and movable longitudinally therealong, and means for reciprocally moving said debris pushing elements along said upstream face, said means for reciprocally moving the debris pushing elements comprising an enlarged paddle wheel mounted on the downstream side of said frame adjacent one end thereof, said paddle wheel being rotatably mounted about an axis generally paralleling the water channel and extending perpendicularly downstream from the frame, and means for drivingly engaging the paddle wheel with the debris pushing elements, each of said debris pushing elements including a resilient wiper blade engaged against the face of said screen means, and an upstream projecting hooked arm for the grasping reception of grass-like debris.

References Cited
UNITED STATES PATENTS 1,100,870   6/1914   Gleeson _____ 210—156

FOREIGN PATENTS 289,774   1/1916   Germany.
871,549   3/1953   Germany.
   268   of 1882   Great Britain.

SAMIH N. ZAHARNA, *Primary Examiner.*

FRANK W. MEDLEY, *Examiner.*